(No Model.) 2 Sheets—Sheet 2.
J. BUCHANAN.
THRASHING MACHINE.
No. 467,477. Patented Jan. 19, 1892.
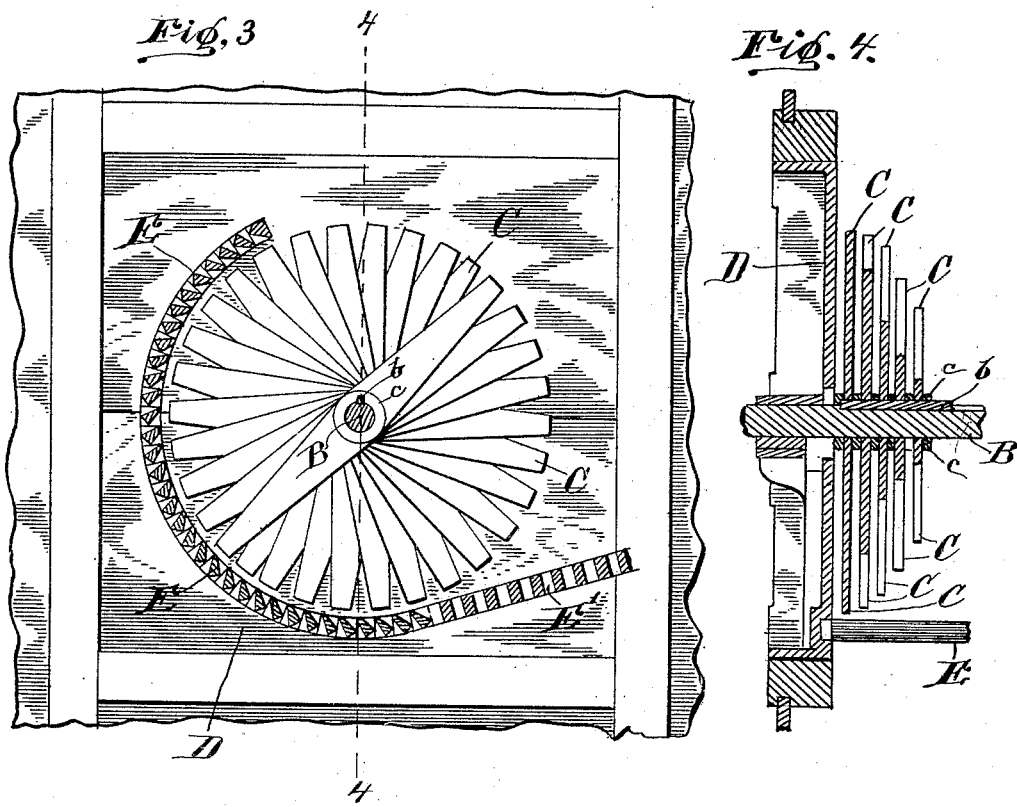
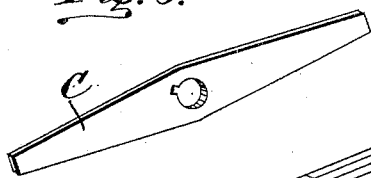
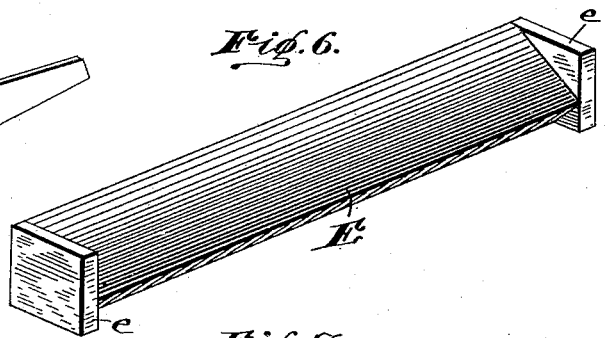
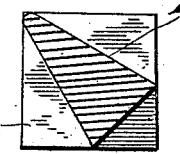
WITNESSES.
C. H. H. Brown,
J. Walsh.
INVENTOR.
James Buchanan,
per E. W. Bradford,
ATTORNEYS.

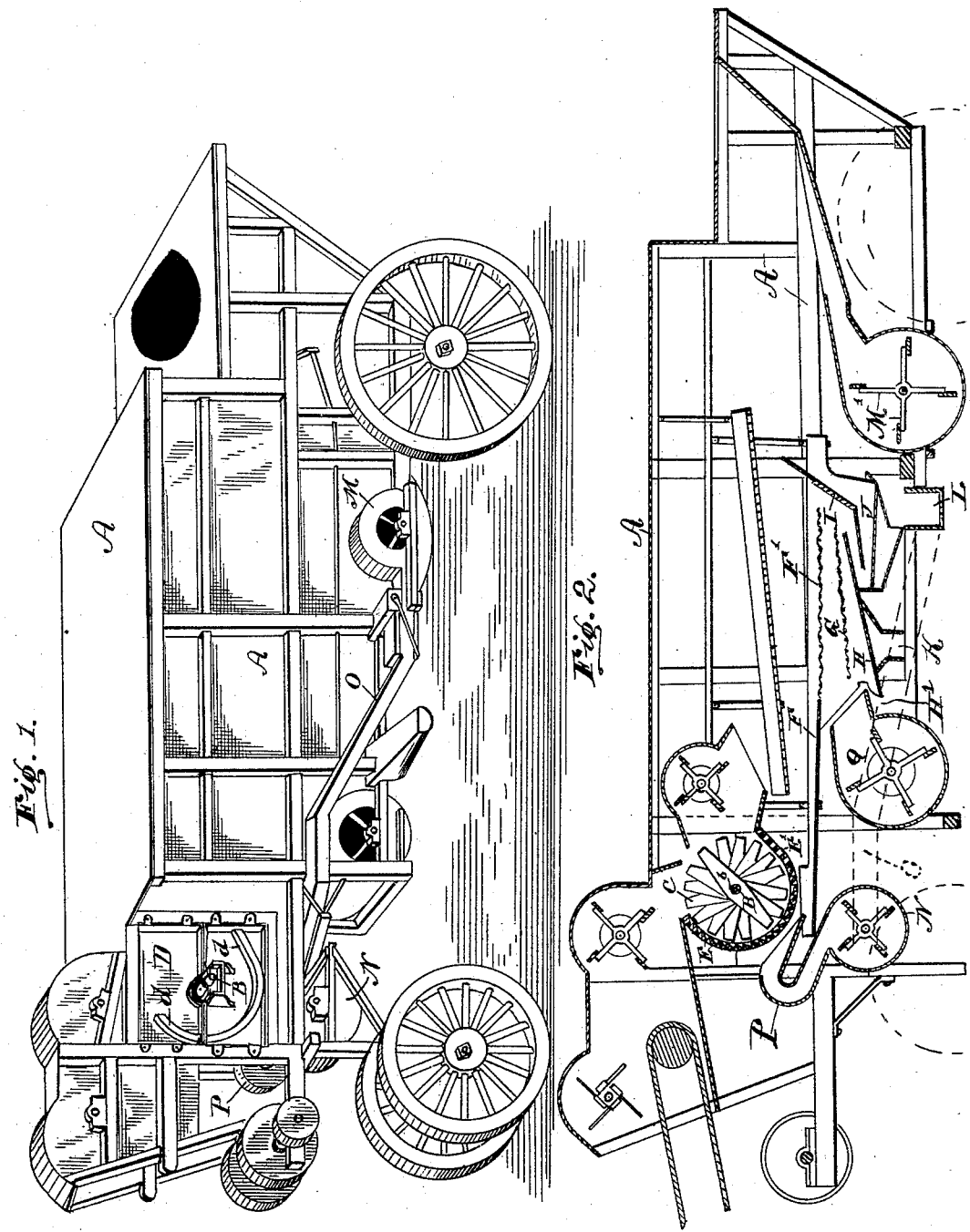

UNITED STATES PATENT OFFICE.

JAMES BUCHANAN, OF INDIANAPOLIS, INDIANA.

THRASHING-MACHINE.

SPECIFICATION forming part of Letters Patent No. 467,477, dated January 19, 1892.

Application filed February 16, 1891. Serial No. 381,624. (No model.)

*To all whom it may concern:*

Be it known that I, JAMES BUCHANAN, a citizen of the United States, residing at Indianapolis, in the county of Marion and State of Indiana, have invented certain new and useful Improvements in Thrashing-Machines, of which the following is a specification.

My said invention consists in various improvements in the construction of thrashing-machines, whereby a more rapid and efficient thrashing and separating of the grain from the straw is accomplished, as will be hereinafter more particularly described and claimed.

Referring to the accompanying drawings, which are made a part hereof, and on which similar letters of reference indicate similar parts, Figure 1 is a perspective view of a thrashing-machine embodying my said invention; Fig. 2, a longitudinal vertical sectional view of the same; Fig. 3, a detail view similar to a portion of Fig. 2, on an enlarged scale, of the beater and adjacent parts; Fig. 4, a sectional view looking toward the right from the dotted line 4 4 in Fig. 3; Fig. 5, a perspective view of one of the teeth of the thrasher cylinder or beater; Fig. 6, a perspective view of one of the bars forming the concave; and Fig. 7, a transverse sectional view, full-sized scale, of the said bar.

In said drawings the portions marked A represent the frame-work and casing of a thrashing-machine; B, the shaft to the thrasher cylinder or beater; C, the teeth to said beater; D, the ends to that portion of the machine which incloses said beater and which also forms portions of the sides of the framework; E, the bars forming the sides of the concave; F, the grain-table upon which the thrashed grain first falls; G, H, I, and J, screens and plates, over which the grain travels before being discharged from the machine; K, a receptacle for the cleaned grain; L, a receptacle for grain which needs further cleaning; M, a blast-fan for forcing said partially-cleaned grain back into the machine; N, an auxiliary fan for the same purpose; O, a spout or conveyer extending from the receptacle L to the fan N; P, a spout leading from said fan N back to above the grain-table F, and Q a fan for the screens.

The frame A and all other parts of the machine not hereinafter particularly described and claimed are not of my present invention, and will not be further described herein, except incidentally in describing the invention. The shaft B is the ordinary shaft to the beater or thrasher-cylinder. It is provided with a spline *b*, which holds the teeth of the beater in place thereon. It is commonly driven directly from the engine or other source of power, as usual, through the medium of a belt and pulleys. The teeth C are cut from sheet metal, preferably from sheet-steel. As I have ordinarily constructed them, they are about three-sixteenths of an inch thick, four inches wide at the middle, and one and one-quarter inches wide at the ends. Each tooth has a hole in the middle, which permits it to be placed on the shaft B, and at varying points around the circumference of this hole are notches which fit over the spline *b*. These notches are varied in position, so that the teeth will advance by regular steps in the circle as they are placed on the shaft. I have found a desirable arrangement to be to put thirty-two of these teeth in a circle, and as each tooth is a double tooth the circumference in the hole in this arrangement is divided into sixteen equal parts and the notches are formed to correspond. Between each one of the double teeth I place a washer *c* of a thickness equal to the distance I desire to have the teeth apart longitudinally of the shaft. A beater constructed in this manner requires but comparatively little power to drive it, as but one in thirty-two of the teeth is at the point of greatest resistance in the straw at one time, while at the same time there is no space in the straw greater than the thickness of one of the washers, which escapes contact with one of the teeth by the time the beater has made a complete revolution. The beater being built up from plates or teeth cut from sheet metal, it is not only simple, but very inexpensive in its construction, and at the same time, as already described, highly efficient. The plates D, which form the ends of the inclosure for the thrasher-cylinder, are cast-metal plates, two at each end, which come together at the point where the shaft passes through the machine, and the boxes for said shaft are formed in or supported by these plates. Surrounding a portion of the circumference of the beater, a short distance from the extreme ends of the beater-teeth, a groove $d$ is formed in each of these ends, which extends from about the point where the straw is received into the machine around the beater to substantially diametrically opposite the point where it starts, which grooves receive the ends of the bars forming the concave and hold them in a predetermined relation to the beater and to each other. Said bars E are formed as shown particularly in Figs. 6 and 7, and are arranged as most plainly shown in Fig. 3. The main portions of said bars are somewhat wedge-shaped in cross-section with the thin edges slightly rounded and nearest the ends of the teeth of the beater, to which they are presented at an angle which most easily permits the thrashed grain to be driven between them, whence it will fall onto the grain-table F. The ends $e$ are substantially square and rest in the grooves $d$, as shown. The concave is continued into a flat grating E′, which is also made up of bars with spaces between them, which bars, however, are formed several in one piece, as, owing to their form, is most convenient. The grain-table F is an ordinary table for the purpose, and is continued into a screen F′. Through this screen F′ the grain falls onto the screen G and thence onto the perforated plate H, through which the perfectly-cleaned grain falls into the receptacle K, while the heavier chaff and broken heads containing some grain are tailed over into the receptacle H′, whence they are elevated to be thrashed over again. That portion of the grain and chaff which passes over the tail of the screen F′ strikes first upon the plate I, whence it falls onto the perforated plate J, through which the heavier portion falls into the receptacle L. The blast of air which is continually passing through the machine drives off all the lighter chaff up next to the straw, whence it is carried off by the straw-elevator. Said elevator, however, will not be further described herein, as it is no part of this present application. That portion of the grain which falls into the receptacle L is driven by the blast-fan M through the tube or spout O to the supplemental or auxiliary fan N, and thence through the curved spout or "goose-neck" P onto the table F, whence it is subjected to the shaking and sieving operation over again, which cleans out whatever of value there is left in the mass, the tendency of the lighter portion of which is to continually work to the top, which tendency is materially aided by the blast of air from the fan Q. Said fan Q is the ordinary fan which drives a blast of air up through the screens and riddles of a grain separator or thrasher. As will be noticed, the fan M is only shown in Fig. 1. The fan M′ (shown upon the same shaft therewith in Fig. 2) serves to furnish an air-blast to the straw-elevator, which is not shown in this application.

Having thus fully described my said invention, what I claim as new, and desire to secure by Letters Patent, is—

1. The thrasher cylinder or beater composed of a shaft, a spline thereto, and a large number of knives or teeth formed of sheet metal and placed thereon, each succeeding knife having a notch in the side of the opening therein which fits over the shaft, located slightly differently from the notch in the preceding knife, whereby by means of said notches and said spline each succeeding knife is caused to extend in a direction slightly in advance of that of the preceding knife, thus causing said knives to assume a spiral relation to the shaft at their outer or operative ends when ready for use, and washers interposed between said knives, whereby they are separated, substantially as shown and described.

2. The combination, with the thrasher cylinder or beater, of a concave composed of bars of a wedge-shaped formation in cross-section and set at an angle with the face of the beater, substantially as shown and described.

3. Bars E from which to form the concave to a thrashing-machine, said bars being wedge-shaped in cross-section throughout the greater portion of their length, and substantially rectangular ends thereon at an angle with the direction of the bodies thereon, substantially as set forth.

4. The combination, in a thrashing-machine, of the screens and riddles, a receptacle for grain which needs further cleaning, a blast-fan, a conduit leading therefrom to an auxiliary fan, said auxiliary fan, and a conduit leading therefrom to above the grain-table, substantially as set forth.

5. The combination, in a thrashing-machine, of the grain-table F, terminating in the screen F′, the screen G, arranged below said screen F′, the perforated plate H below said screen G and above the receptacle K, said receptacle K, the plate I, against which the tailings from the screen F′ strike, the perforated plate J, the receptacle L, arranged below said perforated plate J, and the fans N and Q, substantially as shown and described.

In witness whereof I have hereunto set my hand and seal, at Indianapolis, Indiana, this 11th day of February, A. D. 1891.

JAMES BUCHANAN. [L. S.]

Witnesses:
CHESTER BRADFORD,
EDWARD T. PLANK.